(12) United States Patent
Doi

(10) Patent No.: US 6,671,516 B1
(45) Date of Patent: Dec. 30, 2003

(54) TRANSMISSION CHANNEL ALLOCATION METHOD AND RADIO APPARATUS USING THE SAME

(75) Inventor: Yoshiharu Doi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/533,362

(22) Filed: Mar. 22, 2000

(30) Foreign Application Priority Data

Mar. 24, 1999 (JP) .......................................... 11-080070

(51) Int. Cl.$^7$ ................................................ H04B 7/00
(52) U.S. Cl. .................... 455/509; 455/63.4; 455/562.1; 455/450
(58) Field of Search .......................... 455/509, 63, 450, 455/562.1, 63.4; 370/329, 332, 341, 437

(56) References Cited

U.S. PATENT DOCUMENTS

| | | | | |
|---|---|---|---|---|
| 5,475,864 A | * | 12/1995 | Hamabe ...................... | 455/452 |
| 5,515,378 A | * | 5/1996 | Roy et al. .................... | 370/334 |
| 5,603,082 A | * | 2/1997 | Hamabe ...................... | 455/450 |
| 5,886,988 A | * | 3/1999 | Yun et al. .................... | 370/329 |
| 6,041,237 A | | 3/2000 | Farsakh ....................... | 455/450 |
| 6,466,557 B1 | * | 10/2002 | Doi ............................. | 370/332 |

FOREIGN PATENT DOCUMENTS

| | | |
|---|---|---|
| DE | 197 13 666 | 4/1997 |
| FR | 2 738 098 | 2/1997 |
| JP | 11-032030 | 2/1999 |
| WO | 98/30047 | 7/1998 |

OTHER PUBLICATIONS

Schmidt, R. O.; "Multiple Emitter Location and Signal Parameter Estimation"; *IEEE Trans., Antennas and Prorogation*, vol. 34, No. 3, pp. 276–280, Mar. 1986.

Williams, R. T. et al.; "An Improved Spatial Smoothing Technique for Bearing Estimation in a Multipath Environemtn", *IEEE Trans., Acoustics, Speech, and Signal Processing*, vol. 36, No. 4, pp. 425–432, Apr. 1988.

Shan, Tie–Jun et al.; "On Spatial Smoothing for Direction–of–Arrival Estimation of Coherent Signals", *IEEE Trans., Acoustics, Speech and Signal Processing*, vol. 33, No. 4, pp. 806–811, Aug. 1985.

Copy of European Patent Office Communication including European Search Report for corresponding European Patent Application 00106343 dated Nov. 3, 2000.

* cited by examiner

*Primary Examiner*—Nguyen T. Vo
*Assistant Examiner*—T. Richard Lei
(74) *Attorney, Agent, or Firm*—Armstrong, Westerman & Hattori, LLP.

(57) ABSTRACT

In a transmission/reception system, adaptive arrays separate signals from users by multiplying radio signals received though array antennas by reception weight vectors. A channel allocation device performs allocation of transmission channels in accordance with a cross correlation value of reception signal coefficients of a currently connected user and a newly requesting user calculated by a reception signal coefficient vector calculation device as well as with reception signal power calculated by a reception signal power calculation device.

12 Claims, 15 Drawing Sheets

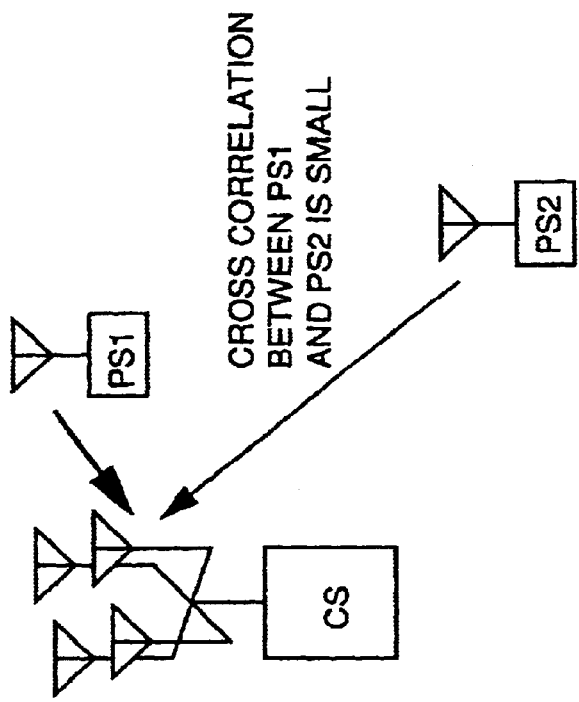
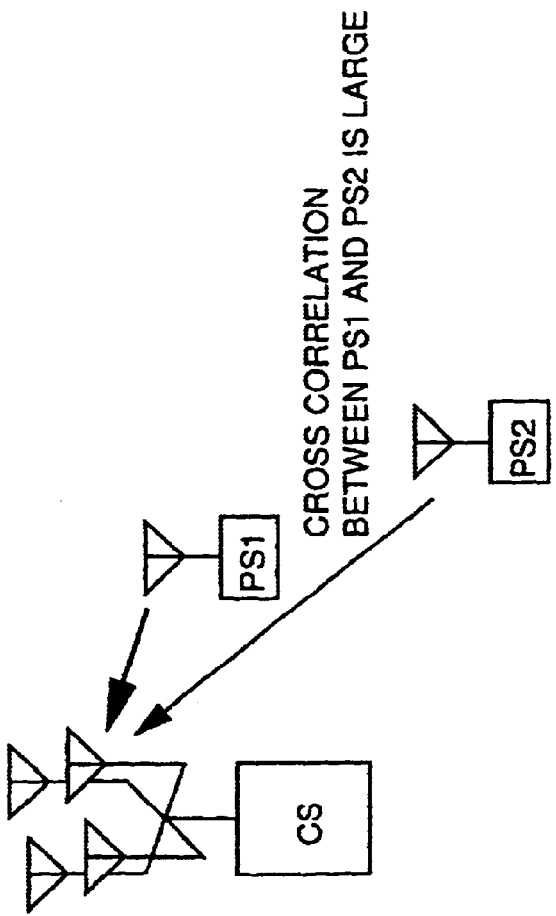

TRANSMISSION CHANNEL ALLOCATION METHOD AND RADIO APPARATUS USING THE SAME

BACKGROUND OF THE INVENTION

1. Field of the Invention

The present invention relates to transmission channel allocation methods and radio apparatuses using the same. More particularly, the present invention relates to a transmission channel allocation method and a radio apparatus using the same for allocating a channel to be used for transmission to a user requesting connection in a PDMA (Path Division Multiple Access) communication system where a plurality of users transmit and receive data such as audio and video using channels of the same frequency and the same time.

2. Description of the Background Art

In the field of the mobile communication systems such as portable telephones that have become extremely popular recently, various transmission channel allocation methods have been proposed to effectively use the frequencies. Some of the methods are actually in practice.

FIG. 13 is a diagram showing arrangements of channels in various communication systems of Frequency Division Multiple Access (FDMA), Time Division Multiple Access (TDMA), and PDMA Referring first to FIG. 13, the systems of FDMA, TDMA, and FDMA will be briefly described. FIG. 13(a) relates to the FDMA system, where analog signals of users 1–4 are frequency-divided to be transmitted in radio waves of different frequencies f1–f4. The signals of users 1–4 are separated by frequency filters.

In the TDMA system shown in FIG. 13(b), the digitized signals of respective-users are time-divided and transmitted in radio waves of different frequencies f1–f4 at every constant period of time (time slot). The signals of respective users are separated by frequency filters and by time synchronization between a base station and a mobile terminal device of each user.

Recently, the PDMA system has been proposed to improve the radio wave frequency usability to comply with the proliferation of portable telephones. In the PDMA system shown in FIG. 13(c), one time slot of the same frequency is spatially divided to transmit data of a plurality of users. In this system, signals of respective users are separated by frequency filters, time synchronization between a base station and a mobile terminal device of each user, and interference canceller such as adaptive arrays.

FIG. 14 is a schematic block diagram showing a transmission/reception system 2000 of a conventional base station for PDMA Four antennas #1 to #4 are provided to distinguish between users PS 1 and PS 2.

In a reception operation, outputs of respective antennas are applied to RF circuit 101, where they are amplified by a reception amplifier and subjected to frequency conversion by local oscillation signals. Thereafter, any unwanted frequency signal is eliminated by a filter. Further, the signals are subjected to A/D conversion to be applied to a digital signal processor 102 as digital signals.

Digital signal processor 102 includes a channel allocation standard calculator 103, a channel allocation apparatus 104, and an adaptive array 100. Channel allocation standard calculator 103 preliminary calculates to determine if the signals from two users can be separated by the adaptive array. Based on the calculation result, channel allocation apparatus 104 provides to adaptive array 100 channel allocation information including user information for selection of the frequency and time. Adaptive array 100 separates the signal of a particular user by performing in real time a weighting operation on signals from four antennas #1 to #4 in accordance with the channel allocation information.

[Structure of Adaptive Array Antenna]

FIG. 15 is a block diagram showing a structure of a transmitting/receiving portion 100a corresponding to one user in adaptive array 100. Referring to FIG. 15, n input ports 20-1 to 20-n are arranged for extracting the signal of an intended user from input signals including a plurality of user signals.

The signals input to respective input ports 20-1 to 20-n are applied to a weight vector controlling portion 11 and multipliers 12-1 to 12-n through switch circuits 1—1 to 10-n.

Weight vector controlling portion 11 calculates to obtain weight vectors $W_{1i}$–$W_{ni}$ using the input signals, a training signal corresponding to a particular user signal which has preliminary been stored in a memory 14, and an output from an adder 13. Here, a subscript i indicates that the weight vector is used for transmission/reception with respect to the ith user.

Multipliers 12-1 to 12-n respectively multiply the input signals from input ports 20-1 to 20-n and weight vectors $W_{1i}$–$W_{ni}$ for application to adder 13. Adder 13 adds output signals from multipliers 12-1 to 12-n for output as a reception signal $S_{RX}(t)$, which is also applied to weight vector controlling portion 11.

Further, transmitting receiving portion 100a includes multipliers 15-1 to 15-n receiving an output signal $R_{TX}(t)$ from the adaptive array of the radio base station and multiplying it by each of $w_{1i}$–$w_{ni}$ that have been applied from weight vector controlling portion 11 for output. Outputs form multipliers 15-1 to 15-n are applied to switch circuits 10-1 to 10-n. In other words, switch circuits 10-1 to 10-n provide signals applied from input ports 20-1 to 20-n to a signal receiving portion 1R for signal reception, and provide signals from a signal transmitting portion IT to input/output ports 20-1 to 20-n for signal transmission.

[Operation Principle of Adaptive Array]

Now, the operation principle of transmitting/receiving portion 100a shown in FIG. 15 will be briefly described.

In the following, for simplification of the description, assume that four antenna elements are provided and two users PS are in connection at the same moment. Then, signals applied from respective antennas to receiving portion 1R are represented by the following equations.

$$RX_1(t)=h_{11}Srx_1(t) +h_{12}Srx_2(t)+n_1(t) \quad (1)$$

$$RX_2(t)=h_{21}Srx_1(t)+h_{22}Srx_2(t)+n_2(t) \quad (2)$$

$$RX_3(t)=h_{31}Srx_1(t)+h_{32}Srx_2(t)+n_3(t) \quad (3)$$

$$RX_4(t)=h_{41}Srx_1(t) +h_{42}Srx_2(t)+n_4(t) \quad (4)$$

Here, a signal $RX_j(t)$ is a reception signal of the jth (j =1, 2, 3, 4) antenna, whereas signal $Srx_i(t)$ is transmitted from the ith (i =1, 2) user.

Further, a coefficient $h_{ji}$ represents a complex coefficient of the signal from the ith user received by the jth antenna, whereas $n_j(t)$ represents a noise included in the jth reception signal.

The above equations (1) to (4) can be placed into vector formats as follows.

$$X(t)=H_1 Srx_1(t)+H_2 Srx_2(t)+N(t) \quad (5)$$

$$X(t)=[RX_1(t), RX_2(t), \ldots, RX_n(t)]^T \quad (6)$$

$$H_i=[h_{1i},h_{2i},\ldots,h_{ni}]^T, (i=1,2) \quad (7)$$

$$N(t)=[n_1(t), n_2(t), \ldots, n_n(t)]^T \quad (8)$$

It is noted that $[\ldots]^T$ is the transposition of $[\ldots]$ in the equations (6) to (8).

Here, X (t) is an input signal vector, $H_i$ is a reception signal coefficient vector of the ith user, and N (t) is a noise vector.

With reference to FIG. 15, the adaptive array antenna outputs, as reception signal $S_{RX}$ (t), the signal obtained by multiplying input signals of respective antennas by weight coefficients $W_{1i}$–$W_{ni}$ and adding them together. It is noted that there are four antennas in this example.

The operation of the adaptive array in the above described environment, for example when a signal $S_{rxl}$ (t) transmitted by the first user is extracted, is as follows.

An output signal y1 (t) from adaptive array 100 can be represented by the following equation that is obtained by multiplying input signal vector X (t) by weight vector $W_1$.

$$y1(t)=X(t)W_1^T \quad (9)$$

$$W_1=[w_{11}, w_{21}, w_{31}, w_{41}]^T \quad (10)$$

In other words, weight vector $W_1$ has weight coefficients $w_{j1}$=1, 2, 3, 4) to be multiplied by jth input signal $RX_j(t)$.

By substituting input signal vector X (t) of equation (5) into equation (9), the following equation is obtained.

$$y1(t)=H_1 W_1^T Srx_1(t)+H_2 W_1^T Srx_2(t)+N(t)W_1^T \quad (11)$$

Here, if adaptive array 100 operates favorably, weight vector $W_1$ is sequentially controlled by weight vector controlling portion 11 to satisfy the following simultaneous equation in accordance with a well-known method.

$$H_1 W_1^T=1 \quad (12)$$

$$H_2 W_1^T=0 \quad (13)$$

When weight vector $W_1$ is perfectly controlled to satisfy the above equations (12) and (13), output signal y1 (t) from adaptive array 100 will eventually be represented by the following equation.

$$y1(t)=Srx_1(t)+N_1(t) \quad (14)$$

$$N_1(t)=n_1(t)w_{11}+n_2(t)w_{21}+n_3(t)w_{31}+n_4(t)w_{41} \quad (15)$$

More specifically, signal $Srx_1$ (t) that has been transmitted by the first of the two users is obatained for output signal y1 (t).

On the other hand, referring to FIG. 15, input signals $S_{TX}$ (t) to adaptive array 100 is applied to transmitting portion 1T of adaptive array 100 and applied to one inputs of multipliers 15-1 to 15-n. The other inputs of the multipliers are supplied with copies of weight vectors $w_{li}$–$W_{ni}$, which have been obtained by calculation in accordance with reception signals by weight vector controlling portion 11 as described above.

The input signals that have been weighted by the multipliers are transmitted to corresponding antennas #1 to #n through corresponding switches 10-1 to 10-n to be further transmitted Here, users PS1 and PS2 are distinguished as follows. Namely, radio signals from portable telephones are transmitted in frame configurations. The radio signal from the portable telephone mainly includes a preamble of a signal sequence known to the radio base station, and data (such as audio) of a signal sequence unknown to the radio base station.

The signal sequence of the preamble includes a signal column of information for determining if the user is desirable for the radio base station to communicate. Weight vector controlling portion 11 of adaptive array of radio base station 1 compares a training signal corresponding to user PS1 that is obtained from memory 14 and the received signal sequence for performing weight vector control (determination of weighting coefficient) to extract a signal which is likely to include the signal sequence corresponding to user PS1.

Recently, due to the rapid proliferation of portable telephones, the usability of channels is now approaching its limit. In the future, it is expected that allocation requests from users would exceed the number of available transmission channels. In such a case, the operation of the mobile communication system will be jeopardized unless some reasonable measures are taken.

In the above described PDMA system, one time-slot of the same frequency is spatially divided to transmit data of a plurality of users. Thus, a transmission channel must be allocated to each user such that interference among signals is eliminated by time synchronization between the base station and a mobile terminal device of each user. Then, it becomes difficult to maintain a sufficient communication quality unless allocation is performed to sufficiently reduce the interference among the plurality of users.

SUMMARY OF THE INVENTION

An object of the present invention is to provide a transmission channel allocation method capable of efficiently allocating a transmission channel to a user who is requesting connection (hereinafter referred to as a newly requesting user) while reducing interference between signals, and to a radio apparatus using the same.

In short, the present invention relates to a method of allocating to a plurality of terminal devices transmission channels for multiple connection to a base station having an array antenna in response to connection requests from the plurality of terminal devices. The method includes steps of: searching connectable transmission channel candidates among empty transmission channels based on a magnitude of cross correlation between a reception signal coefficient vector from a currently connected user and a reception signal coefficient vector of a user newly requesting connection; and allocating one of transmission channel candidates to the newly requesting user in accordance with the fact that a difference in reception signal electric power between the currently connected user and the newly requesting user does not exceed a prescribed value.

According to another aspect of the present invention, a radio apparatus for performing path-divided multiple connection with respect to a plurality of terminal devices is provided. The radio apparatus includes; array antennas; a plurality of reception signal separating portions; a reception signal power calculating portion; and a channel allocating portion.

The plurality of reception signal separating portions separate in real time reception signals by multiplying reception weight vectors of respective terminal devices by the reception signals from the adaptive array antennas.

The reception signal power calculating portion derives reception signal power of respective terminal devices.

The channel allocating portion determines a connectable transmission channel of empty transmission channels based on a cross correlation magnitude of reception signals from the already connected user and the newly requesting user as well as a difference in reception signal power, and allocates the transmission channel to the newly requesting user.

Therefore, a main advantage of the present invention is that a transmission channel allocation method is provided which enables path multiplex connection to be readily performed in terms of a base station, and enables allocation of the transmission channel to the newly requesting user whose reception power does not differ from that of the already connected user by a value exceeding a prescribed value, while maintaining a good communication quality.

Another advantage of the present invention is that a radio apparatus can be provided which enables path multiplex connection to be readily performed in terms of a base station, and enables allocation of the transmission channel to the newly requesting user whose reception power does not differ from that of the already connected user by a value exceeding a prescribed value, while maintaining a good communication quality.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3A is a diagram shown in conjunction with the case where a cross correlation value between users is large in channel allocation based only on the cross correlation value of reception signal coefficient vectors, whereas FIG. 3B is a diagram shown in conjunction with the case where the cross correlation value between users is small.

FIG. 4A is a schematic diagram shown in conjunction with the case where the cross correlation value is small and a difference in reception power is large, whereas

DESCRIPTION OF THE PREFERRED EMBODIMENTS

First Embodiment
[Structure of Transmission/Reception System 1000]

Figure 1:
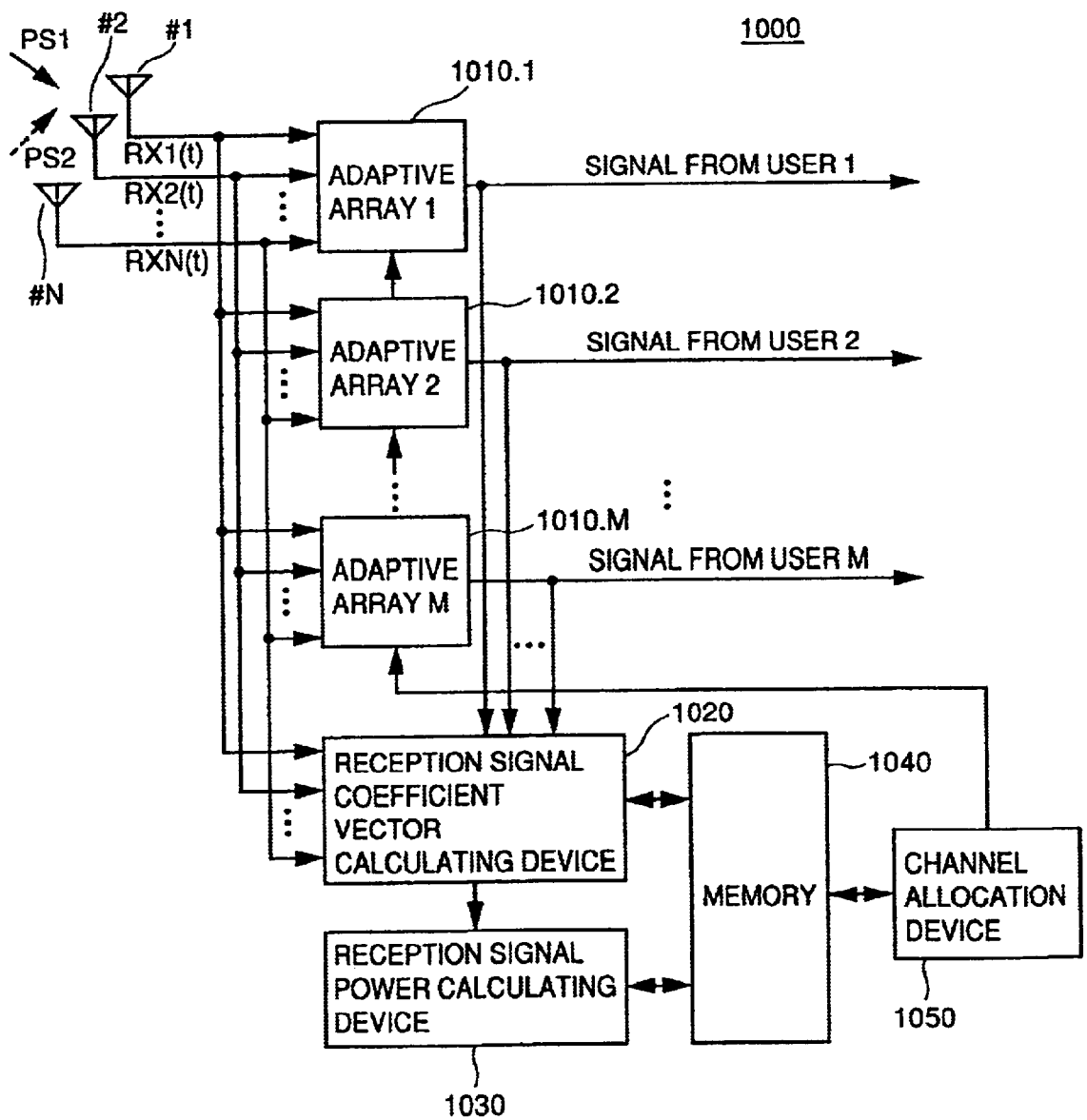
FIG. 1 is a schematic block diagram showing a structure of a radio apparatus 1000 according to a first embodiment of the present invention.

FIG. 1 is a schematic block diagram showing a structure of transmission/reception system 1000 of a base station for PDMA.

In the structure shown in FIG. 1, N (N: natural number) antennas #1 to #N are arranged for distinguishing between users PS1 and PS2.

Figure 15:
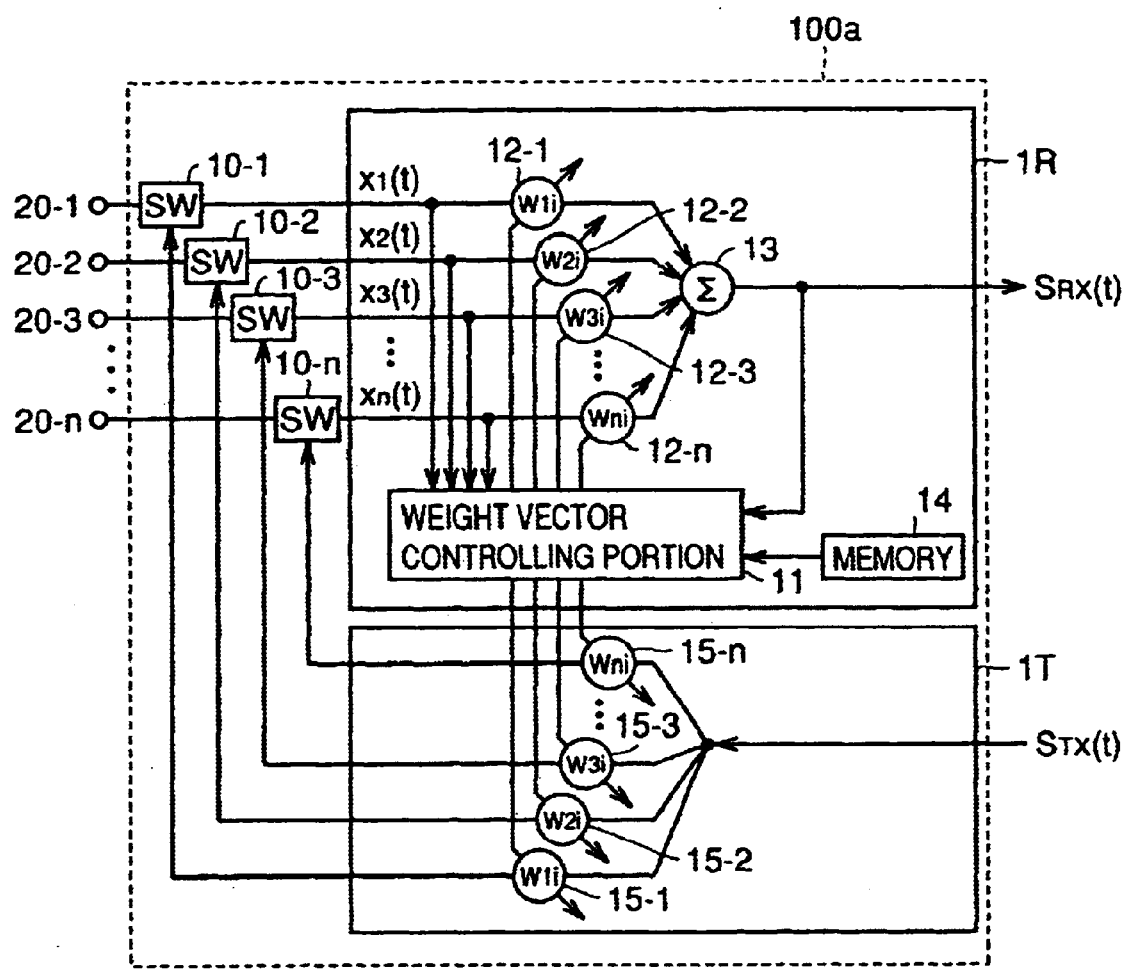
FIG. 15 is a block diagram showing a structure of transmitting/receiving portion 100a for one user of adaptive array 100.

Transmission/reception system 1000 includes adaptive arrays 1010.1 to 1010.M respectively receiving signals from antennas #1 to #N for separation of signals from corresponding users. The structures of adaptive arrays 1010-1 to 1010.M are similar to those of conventional adaptive arrays shown in FIG. 15.

Transmission/reception system 1000 further includes: a reception signal coefficient vector calculating device 1020 receiving signals from #1 to #N and output signals from adaptive arrays 1010.1 to 1010-M for calculating reception signal coefficient vectors; a reception signal power calculating device 1030 calculating reception signal power of every user based on the reception signal coefficient vector of every user that has been derived from reception signal coefficient vector calculating device 1020; a memory 1040 for storing and holding the reception signal coefficient vector and the reception signal power of every user; and a channel allocation device 1050 for allocating channels in accordance with the reception signal coefficient vector and the reception signal power stored in memory 1040.

Channel allocation device 1050 provides to adaptive arrays 1010.1 to 1010.M channel allocation information including user information for selection of frequency and time in accordance with the channel allocation information obtained with the procedure described below.

Adaptive arrays 1010.1 to 1010.M separate only signals from a particular user by performing in real time weighting calculations on signals from antennas #1 to #N in accordance with the channel allocation information.

The values of reception signal coefficient vectors and reception signal power stored in the above described memory 1040 are updated as necessary.

[Brief Description of Operation of Transmission/Reception System 1000].

Figure 2:
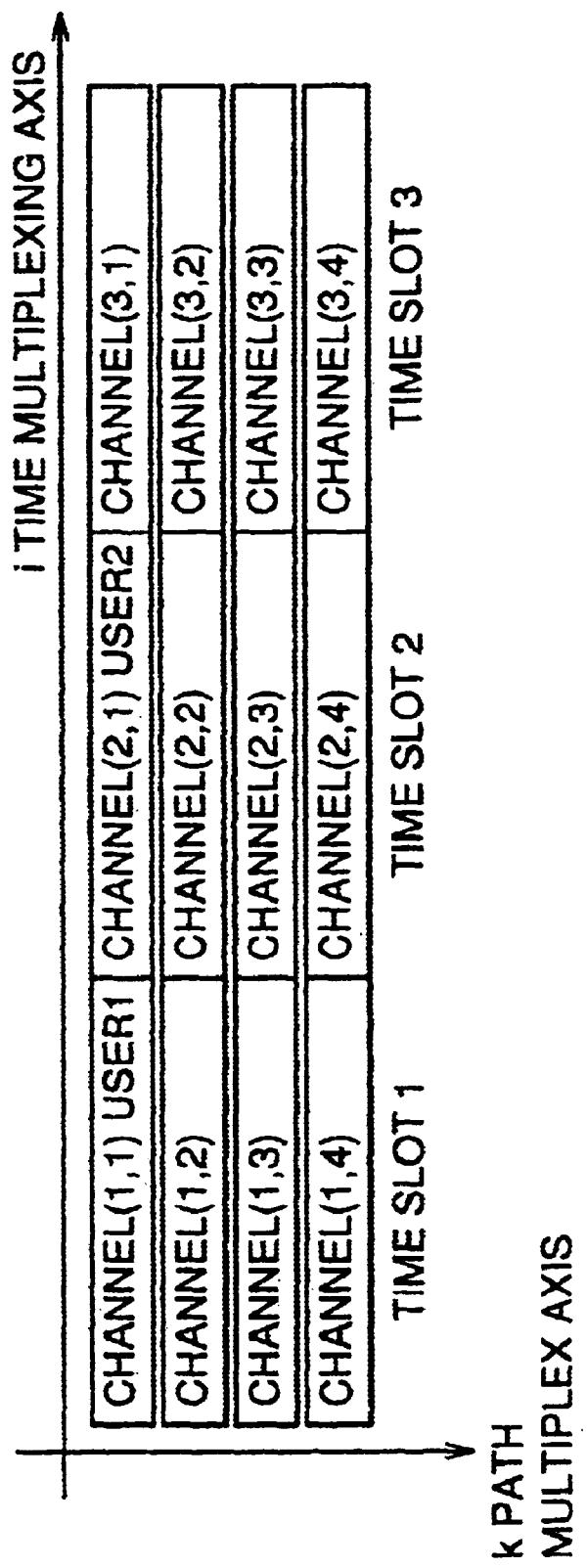
FIG. 2 is a diagram showing an arrangement of channels in a PDMA system.

FIG. 2 is a diagram showing arrangements of channels in the PDMA system. Referring to FIG. 2, a path multiplex degree is four and there are three time slots, so that there are channels (1, 1) to (3, 4), i.e., twelve channels in total Referring to FIG. 2, first, a communication channel is established with respect to one user, and the first user is allocated to channel (1, 1).

In this case, when the second user requests allocation of channel, such allocation to channel can be performed in accordance with a cross correlation value of reception signal coefficient vectors. However, the channel allocation only in accordance with the cross correlation value of reception signal coefficient vectors suffers from the following problem.

FIGS. 3A and 3B are schematic diagrams each showing a structure for allocating a channel to the second user in accordance with the cross correlation value of the reception signal coefficient vectors as in the case of FIG. 2.

FIG. 3A relates to the case where the cross correlation value of the reception signal coefficient vectors between users PS1 and PS2 is large. In this case, channel allocation to user PS2 is not possible. On the other hand, FIG. 3B relates to the case where the cross correlation value of the reception signal coefficient vectors between users PS1 and PS2 is small. In this case, channel allocation to user PS2 is basically possible. However, if channel allocation is performed only in accordance with the cross correlation value of the reception signal coefficient vectors, for example, user PS2 may be allocated to one of channels which are in a path multiplex relationship even if a difference in reception power of radio waves from users PS1 and PS2 is large. In other words, in the example shown in FIG. 2, user PS2 is allocated to channel (2, 1), but a sufficient communication quality is not ensured for PS2 with small reception power.

In the channel allocation method and radio apparatus of the first so embodiment, as described below, channel allocation is performed in accordance not only with the cross correlation value of reception signal coefficient vectors but also with reception signal power, so that a sufficient communication quality is ensured for each user.

Figure 4A:
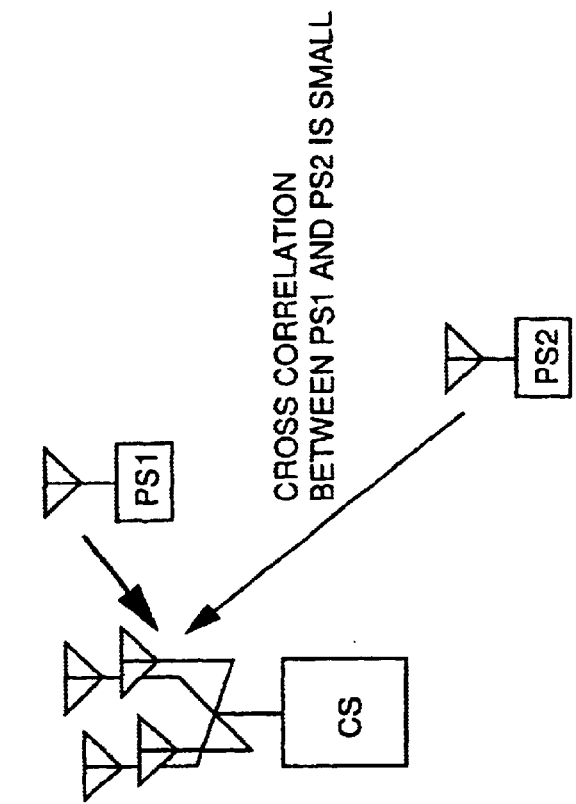
Figure 4B:
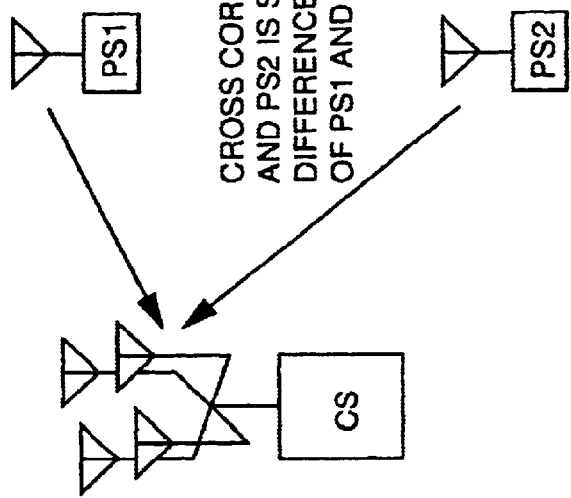
FIG. 4B is a schematic diagram shown in conjunction the case where the cross correlation value is small and the difference in reception power is small, in channel allocation based both on the cross correlation value and reception power.

FIGS. 4 and 4B are schematic diagrams each showing a structure for allocating a channel to the second user in accordance with a cross correlation value of the reception signal coefficient vectors and the reception power.

FIG. 4A relates to the case where the cross correlation value of the reception signal coefficient vectors between users PS1 and PS2 is small, and the reception power difference is large. In such a case, channel allocation to user PS2 is not possible. On the other hand, FIG. 4B relates to the case where the cross correlation value of the reception signal vectors between users PS1 and PS2 is small and the reception power difference is also small. In such a case, channel allocation to user PS2 is possible. In other words, a path multiplex is performed on user terminals having reception signal coefficient vectors of which cross correlation value is smaller than a prescribed first standard value and reception power difference is smaller than a prescribed second standard value. Thus, a good communication quality is ensured for any user terminal.

[Operation of Reception Signal Coefficient Vector Calculator 1020]

Next, the operation of reception signal coefficient vector calculator 1020 shown in FIG. 1 will be described.

If there are four antenna elements and two users in communication at the same moment, signals output from the reception circuit via respective antennas are represented by the above mentioned equations (1) to (4).

Then, if reception signals of the antennas represented by equations (1) to (4) are rewritten in vector formats, the following equations (5) to (8) are obtained.

$$X(t) = H_1 Srx_1(t) + H_2 Srx_2(t) + N(t) \quad (5)$$

$$X(t) = [RX_1(t) RX_2(t), \ldots, RX_n(t)]^T \quad (6)$$

$$H_i = [h_{1i}, h_{2i}, \ldots, h_{ni}]^T, (i=1,2) \quad (7)$$

$$N(t) = [n_1(t), n_2(t), \ldots, n_n(t)]^T \quad (8)$$

Here, if the adaptive arrays operate favorably, the signals from users are separated and extracted, so that all of the above mentioned signals $Srx_i(t)(i=1, 2)$ have known values.

Then, by utilizing the fact that signals $Srx_i(t)$ (i=1, 2) have known values, the following reception signal vectors $H_1 = [h_{11}, h_{21}, h_{31}, h_{41}]$ and $H_2 = [h_{12}, h_{22}, h_{32}, h_{41}]$ can be derived More specifically, the reception signal is multiplied by a known user signal, for example, signal $Srx_1(t)$ from the first user, to obtain an ensemble average (a time average).

$$E[X(t) \cdot Srx_1^*(t)] = H_1 \cdot E[Srx_1(t) \cdot Srx_1^*(t)] + H_2 \cdot E[Srx_2(t) \cdot Srx_1^*(t)] + E[N(t) \cdot Srx_1^*(t)] \quad (16)$$

In equation (16), E[. . . ] represents a time average and S*(t) represents a conjugate complex S (t). If the average is measured over a sufficient period of time, the following average value is obtained.

$$E[Srx_1(t) \cdot Srx_1^*(t)] = 1 \quad (17)$$

$$E[Srx_2(t) \cdot Srx_1^*(t)] = 0 \quad (18)$$

$$E[N(t) \cdot Srx_1^*(t)] = 0 \quad (19)$$

The value of equation (18) is 0 because there is no cross correlation between signals $Srx_1$ (t) and $Srx_2(t)$ Similarly, the value of equation (19) is 0 because there is no cross correlation between signal $Srx_1$ (t) and a noise signal N (t).

As a result, as shown below, the ensemble average of equation (16) equals to reception signal coefficient vector $H_1$.

$$E[X(t) \cdot Srx_1^*(t)] = H_1 \quad (20)$$

With the above described procedure, reception signal coefficient $H_1$ transmitted from first user PS1 can be measured.

Similarly, by calculating an ensemble average of input signal vector X (t) and signal $Srx_2$ (t), reception signal coefficient vector $H_2$ of the signal transmitted from second user PS2 can be measured.

[Operation of Reception Signal Power Calculating Device 1030]

Figure 14:
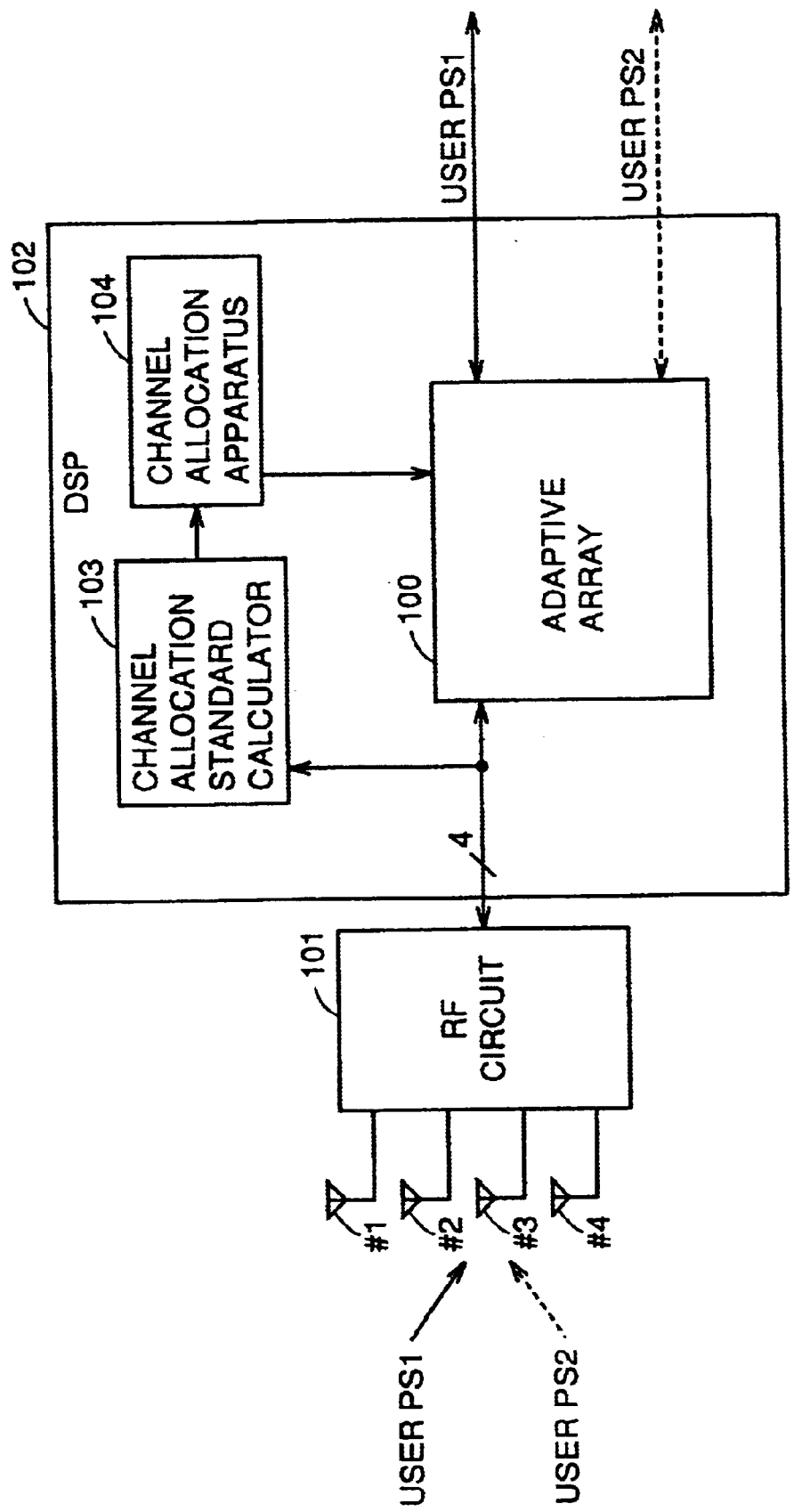
FIG. 14 is a schematic block diagram showing a transmission/reception system 2000 of a conventional base station for PDMA

Now, the calculation of the reception signal power performed by the above mentioned reception signal power calculating device 1030 will be described. As in the conventional example described with reference to FIGS. 14 and 15, assume that there are four antenna elements for simplification of description.

If the reception signal coefficient vector calculated in accordance with equation (20) is used, for example, the reception signal power from user PS1 can be calculated by the following equation (21).

$$P_1 = H_1^2/N = (h_{11}^2 + h_{21}^2 + h_{31}^2 + h_{41}^2)/N \quad (21)$$

More specifically, if there are N antenna elements, generally, the reception signal power from the ith user PS1 can be obtained by the following equation (22).

$$P_i = H_i^2/N = (h_{1i}^2 + h_{2i}^2 + \ldots + h_{Ni}^2)/N \quad (22)$$

[Operation of Channel Allocation Device 1050]

Figure 5:
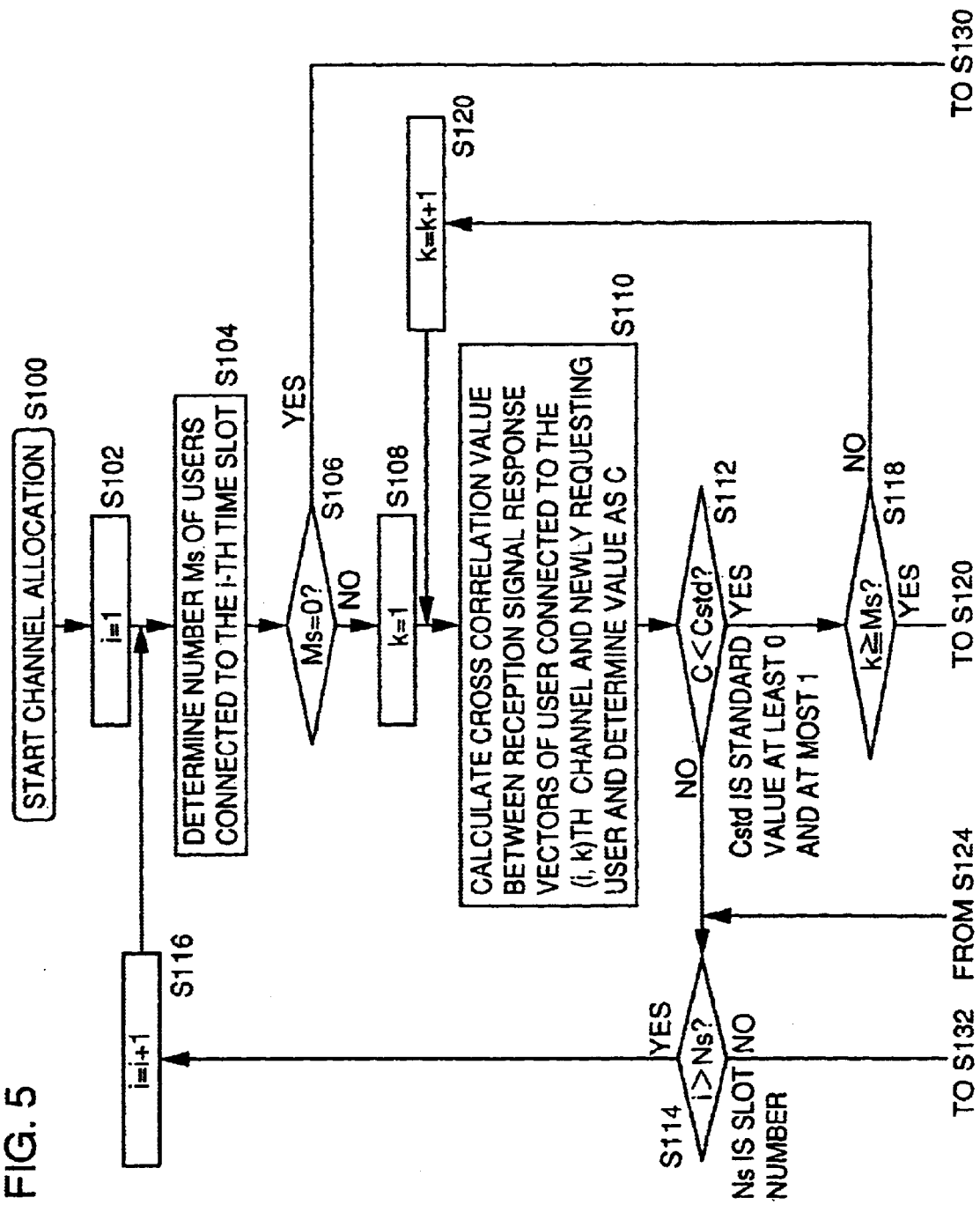
FIG. 5 is a first flow chart shown in conjunction with an operation of a channel allocation device 1050 of the first embodiment.
Figure 6:
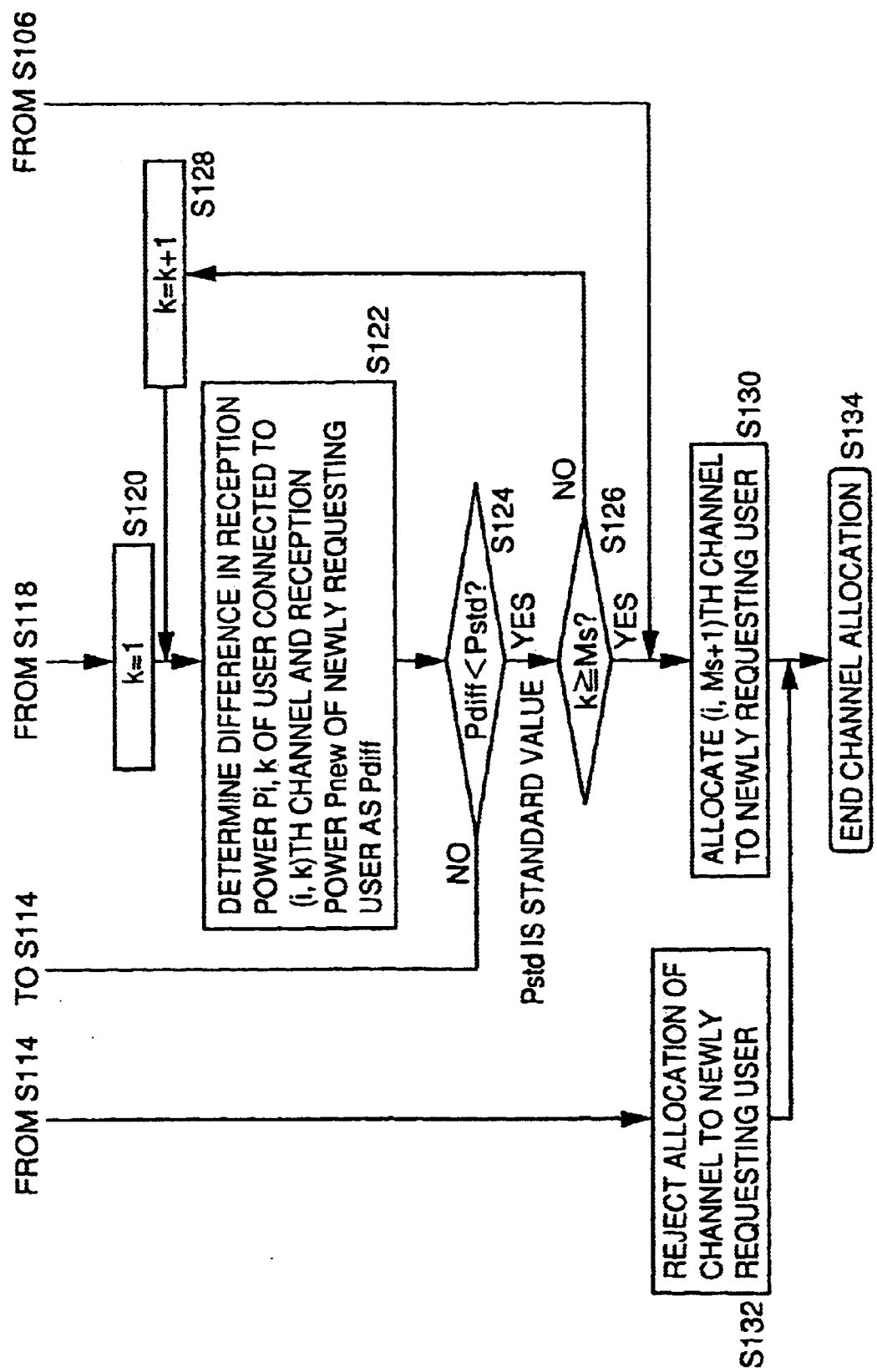
FIG. 6 is a second flow chart shown in conjunction with the operation of channel allocation device 1050 of the first embodiment.

FIGS. 5 and 6 are flow charts shown in conjunction with the operation of channel allocation device 1050 shown in FIG. 1.

Referring to FIGS. 5 and 6, when a channel allocation operation is started (step S100), channel allocation device 1050 initializes a value of a pointer variant i at 1, indicating a time slot that is possibly subjected to channel allocation (step S 102). Successively, user number Ms currently connected to the ith time slot is determined (step S104). If user number Ms is 0, the process proceeds to step S103, the (i, Ms+1)th channel is allocated to a new user (step S130), and the channel allocation operation ends (S134).

If user number Ms currently connected to the ith time slot is not 0 (step S106), a value of a pointer variant k, indicating a path that is possibly subjected to channel allocation, is initialized at 1 (step S108).

Thereafter, a cross relation value C of reception signal coefficient vector $H_{C_i}k$ of the user connected to the (i, k)th channel and reception signal coefficient vector Hn of the newly requesting user is calculated in accordance with the following equation (step S100).

$$C=|(H_{(i,k)} \cdot Hn)|/(|H_{(i,k)}| \cdot |Hn|)$$

Here, (X·Y), represents an inner product of vectors X and Y, and |X| represents a magnitude of vector X.

Then, cross correlation value C and standard value Cstd (0<Cstd ≦1) are compared (step S112).

If cross correlation value C is equal to or greater than standard value Cstd (step S112), variant i and total number Ns of time slots are compared (step S114). If variant i is equal to or smaller than total number Ns of time slots, variant i is incremented by 1 (step S116), and the process returns to step S104. On the other hand, if variant is equal to or greater than total number Ns of time slots, channel allocation device 1050 rejects channel allocation to the new user (step S 132), and the channel allocation operation ends (step S134).

It is noted that the total number of time slots is preliminary determined according to the system and, in the case of a PHS (Personal Handy phone System), N equals to 3.

On the other hand, if cross correlation value C is smaller than standard value Cstd (step 112), variant k and user number Ms of the ith time slot are compared (step 118). If variant k is smaller than user number Ms (step 118), variant k is incremented by 1 (step S 120), and the process returns to step S110. More specifically, determination is made as to whether cross correlation value C of the reception signal coefficient of the newly requesting user and that of each user currently connected to the ith time slot is smaller than standard value Cstd.

If cross correlation value C of the reception signal coefficient of the newly requesting user and that of each user currently connected to the ith time slot is smaller than standard value Cstd, the process proceeds to step S120 for measuring a difference in reception signal power of the currently connected user and the newly requesting user.

More specifically, again, a value of pointer variant k indicating a path that is possibly subjected to channel allocation (step S120) is initialized at 1 and a difference Pdiff between reception power Pi, k of the user connected to the (i, k)th channel and reception signal power Pnew of the newly requesting user is calculated (step S122).

If reception signal power difference Pdiff exceeds a prescribed standard value Pstd (step S124), variant i and total number Ns of time slots are compared (step S114). If variant i is equal to or smaller than total number Ns of time slots, variant i is incremented by 1 (step S116), and the process returns to step S104. On the other hand, if variant i exceeds total number Ns of time slots, channel allocation device 1050 rejects channel allocation to the new user (step S132) and the channel allocation operation ends (step S134).

On the other hand, if difference Pdiff in reception signal power is smaller than standard value Pstd (step S124), variant k and number Ms of users connected to the ith time slot are compared (step S126). If variant k does not exceed Ms (step S126), variant k is incremented by 1 (step S128), and the process returns to step S122. In other words, determination is made as to if Pdiff is smaller than Pstd for every user connected to the ith time slot.

If Pdiff is smaller than Pstd for every user connected to the ith time slot with respect to the newly requesting user, the process proceeds to step S130, the (i, Ms+l)th channel is allocated to the newly requesting user (step S130), and the channel allocation operation ends (step S134).

The above described operation of channel allocation device 1050 enables channel allocation in accordance not only with the cross correlation value of reception signal coefficients but also with reception signal power, so that a sufficient communication quality can be ensured for each user who is in connection with a communication channel.

Second Embodiment

Figure 7:
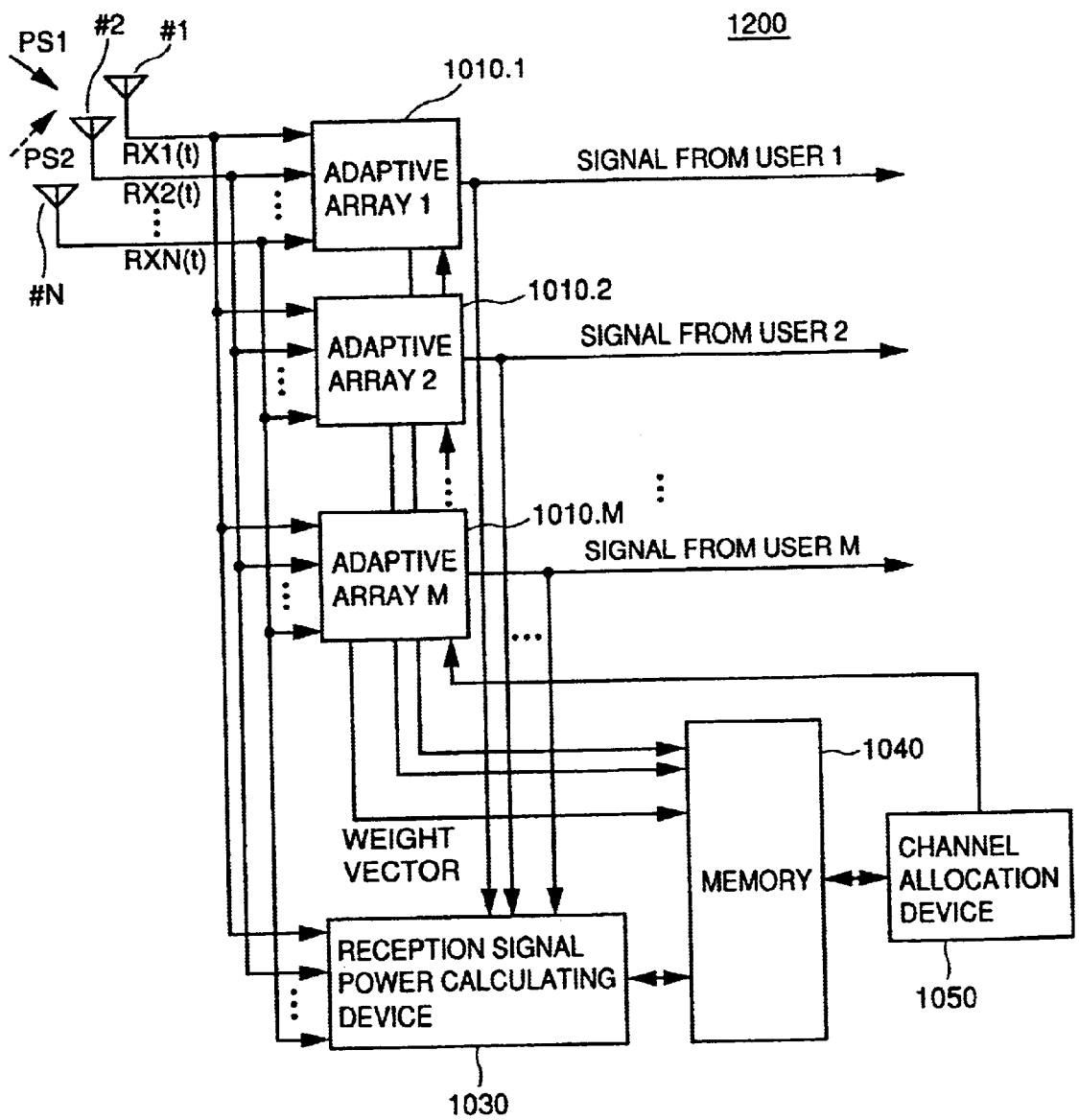
FIG. 7 is a schematic block diagram showing a structure of a transmission/reception system 1200 of a base station for PDMA according to the second embodiment of the present invention.

FIG. 7 is a schematic block diagram showing a structure of transmission/reception system 1200 of a base station for PDMA according to a second embodiment of the present invention.

Transmission/reception system 1200 differs from transmission/reception system 1000 of the first embodiment shown in FIG. 1 in that memory 1040 directly receives and stores values of weight vectors from adaptive arrays 1010.1 to 1010.M, and channel allocation device 1050 performs allocation in accordance with weight vector values in memory 1040 and reception signal power. The other parts of the structure are the same as those of transmission/reception system 1000 of the first embodiment. Thus, the same parts are denoted by the same reference numerals, and description thereof will not be repeated.

Figure 8:
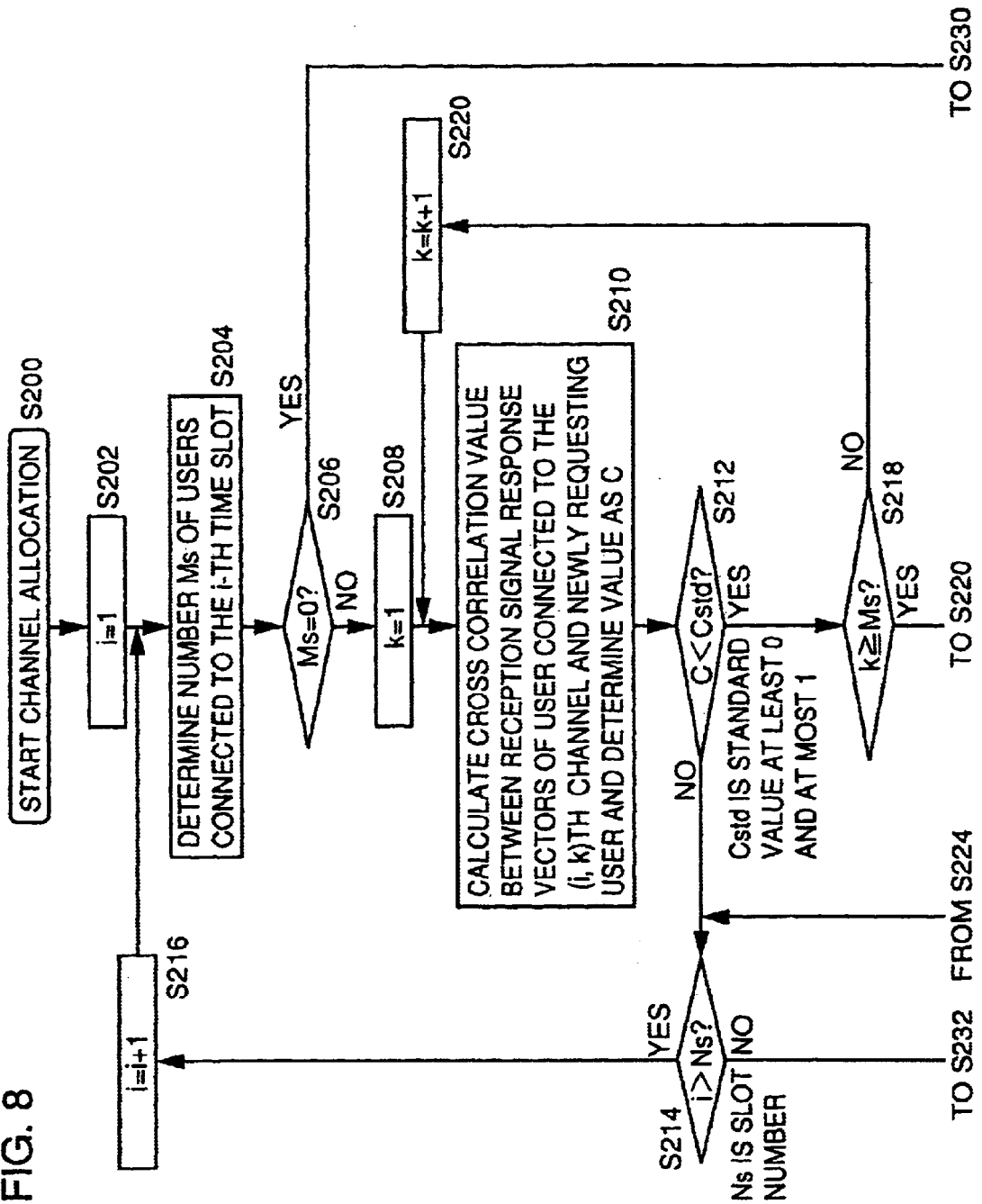
FIG. 8 is a first flow chart shown in conjunction with an operation of the second embodiment of the present invention.
Figure 9:
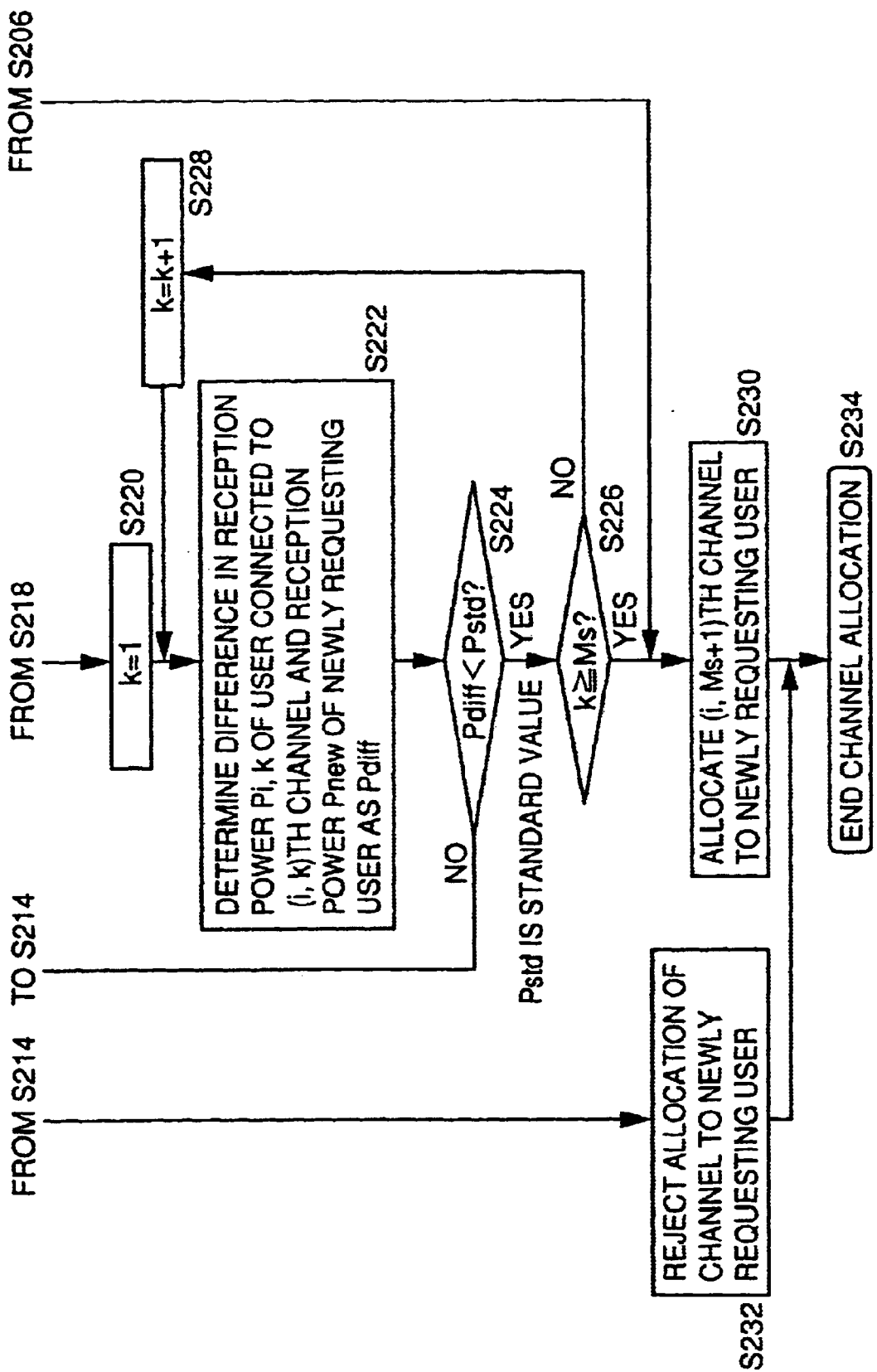
FIG. 9 is a second flow chart shown in conjunction with the operation of the second embodiment of the present invention.

FIGS. 8 and 9 are flow charts shown in conjunction with the operation of channel allocation device 1050 according to the second embodiment of the present invention.

In the first embodiment, the channel allocation is performed in accordance with a cross correlation value of the reception signal coefficient vectors as well as a difference in reception signal power of the currently connected user and the newly requesting user.

In a channel allocation process of the second embodiment, channel allocation is performed in accordance with a cross correlation value of weight vectors as well as a difference in reception signal power of the currently connected user and the newly requesting user.

More specifically, the channel allocation device 1050 of the second embodiment differs from that of the first embodiment in that cross correlation value C of weight vectors is calculated in step S210 of FIG. 8.

Here, cross correlation value C of reception signal coefficient vector $W_{(i,k)}$ of the user connected to the (i, k)th channel and reception signal coefficient vector Wn of the newly requesting user is calculated in accordance with the following equation.

$$C=|(W_{(i,k)} \cdot Wn)|/(|W_{(i,k)}| \cdot |Wn|)$$

The other parts of the structure are the same as those of the structure for a channel allocation process of the first embodiment, and therefore description thereof will not be repeated.

With such a structure, in the operation of channel allocation device 1050, channel allocation is performed in accordance not only with a cross correlation value of weight vectors but also with reception signal difference, so that a sufficient communication quality is ensured for each user who is in connection with the communication channel. In addition, a sufficient communication quality is ensured with a simpler structure as compared with transmission/reception system 1000 of the first embodiment.

Third Embodiment

Figure 10:
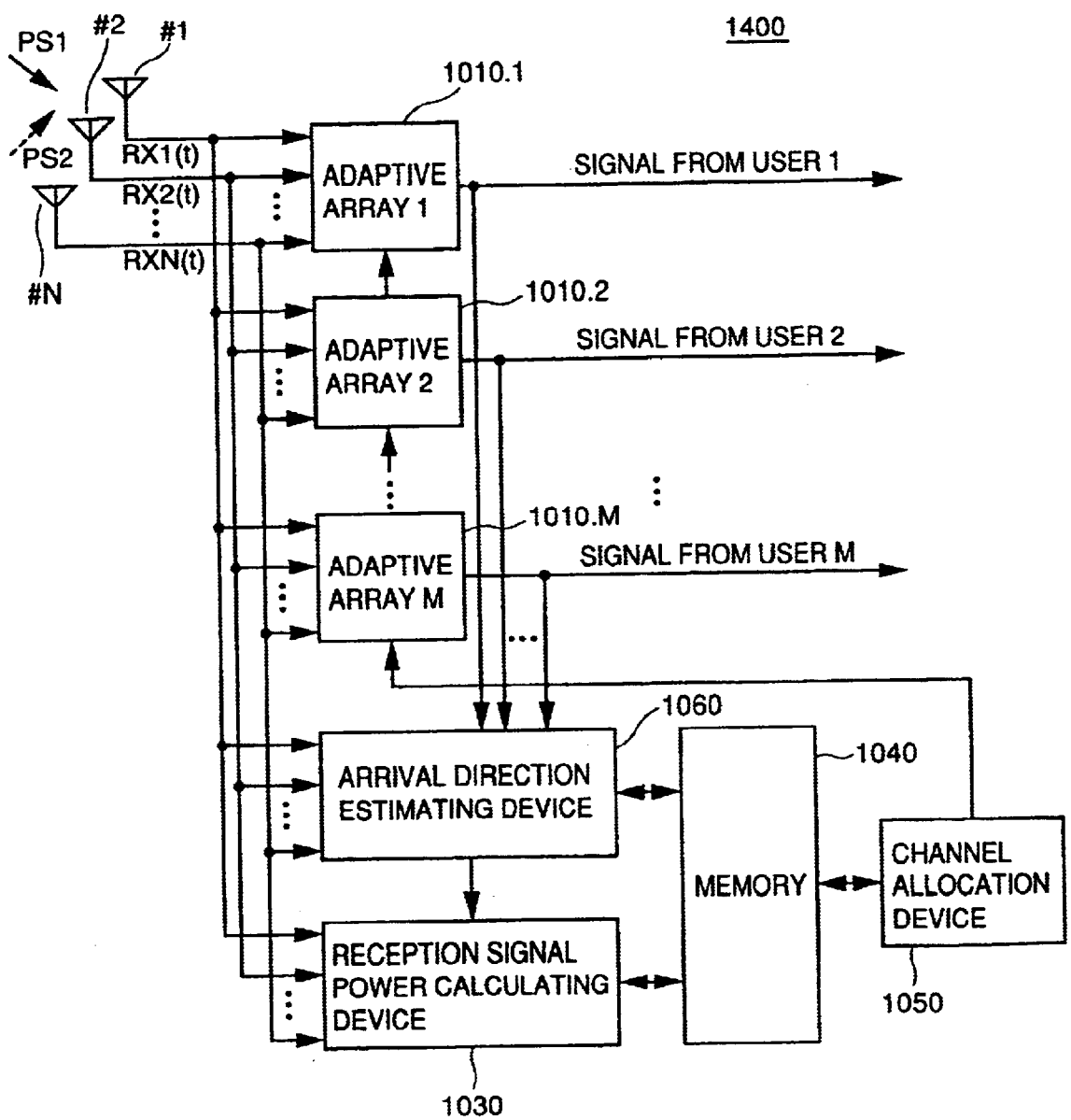
FIG. 10 is a schematic block diagram showing a structure of a transmission/reception system 1400 of a base station for PDMA according to a third embodiment of the present invention.

FIG. 10 is a schematic block diagram showing a structure of a transmission/reception system 1400 of a base station for PDMA according to the third embodiment of the present invention.

System 1400 differs from transmission/reception system 1000 of the first embodiment in that reception signal coefficient vector calculating device 1020 is replaced by an arrival direction estimating device 1060 for estimating an arrival direction of a reception signal, and in that channel allocation device 1050 performs channel allocation in accordance with the arrival direction of the reception signal and reception signal power stored in memory 1040. Other parts of the structure are the same as those of transmission/reception system 1000 of the first embodiment. Thus, the same parts are denoted by the same reference characters and description thereof will not be repeated.

Figure 11:
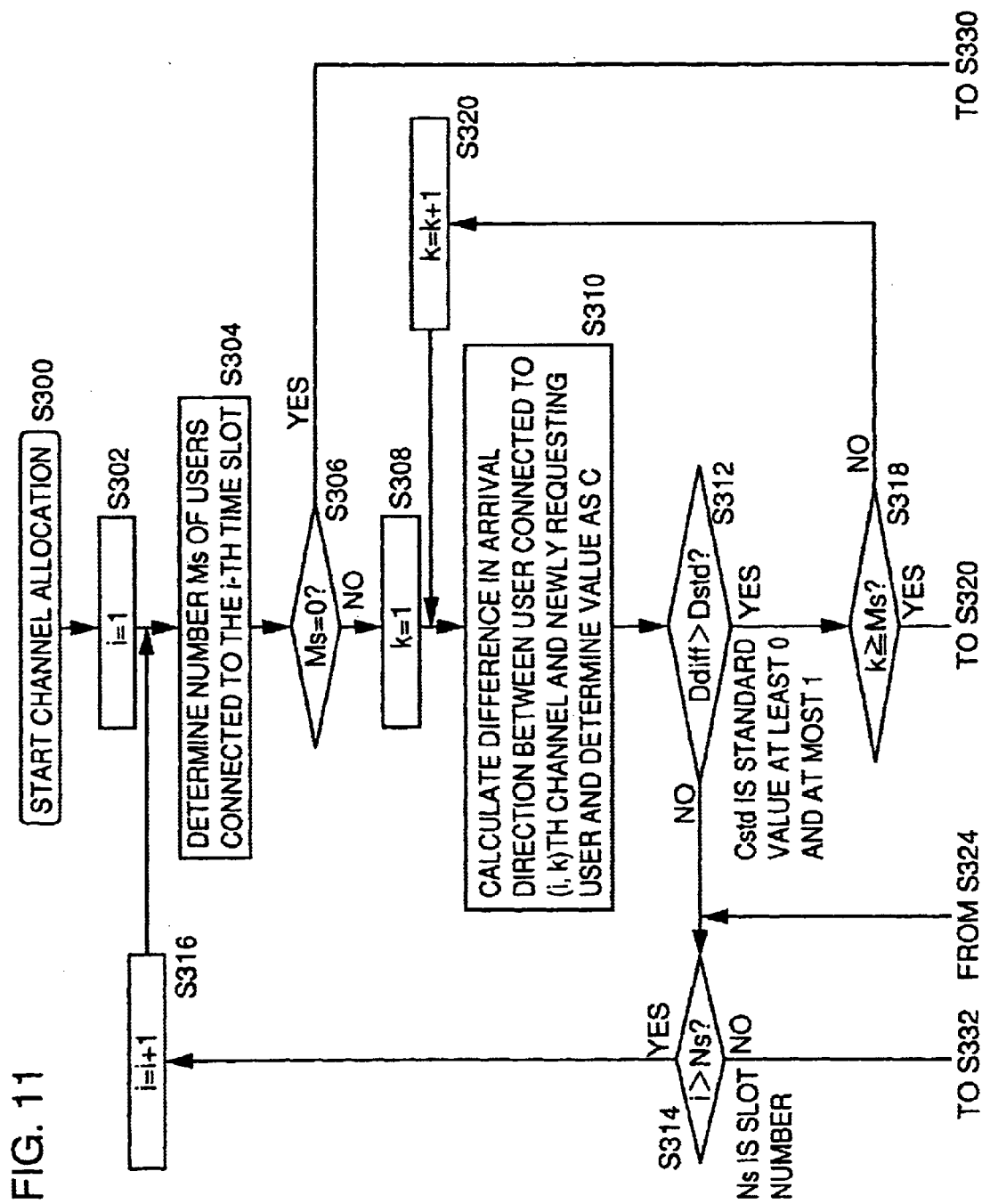
FIG. 11 is a first flow chart shown in conjunction with an operation of the third embodiment of the present invention.
Figure 12:
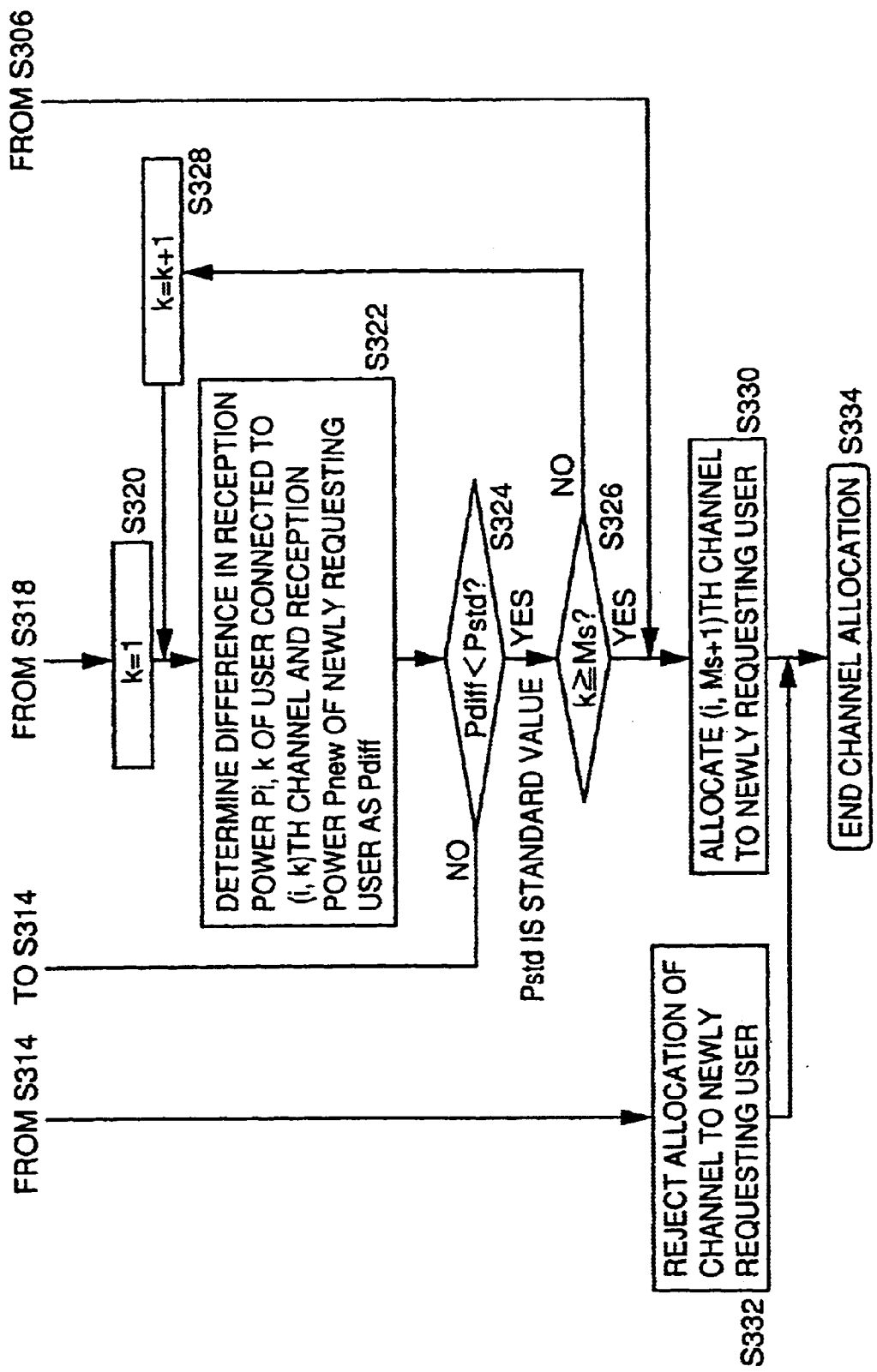
FIG. 12 is a second flow chart shown in conjunction with the operation of the third embodiment of the present invention.
Figure 13:
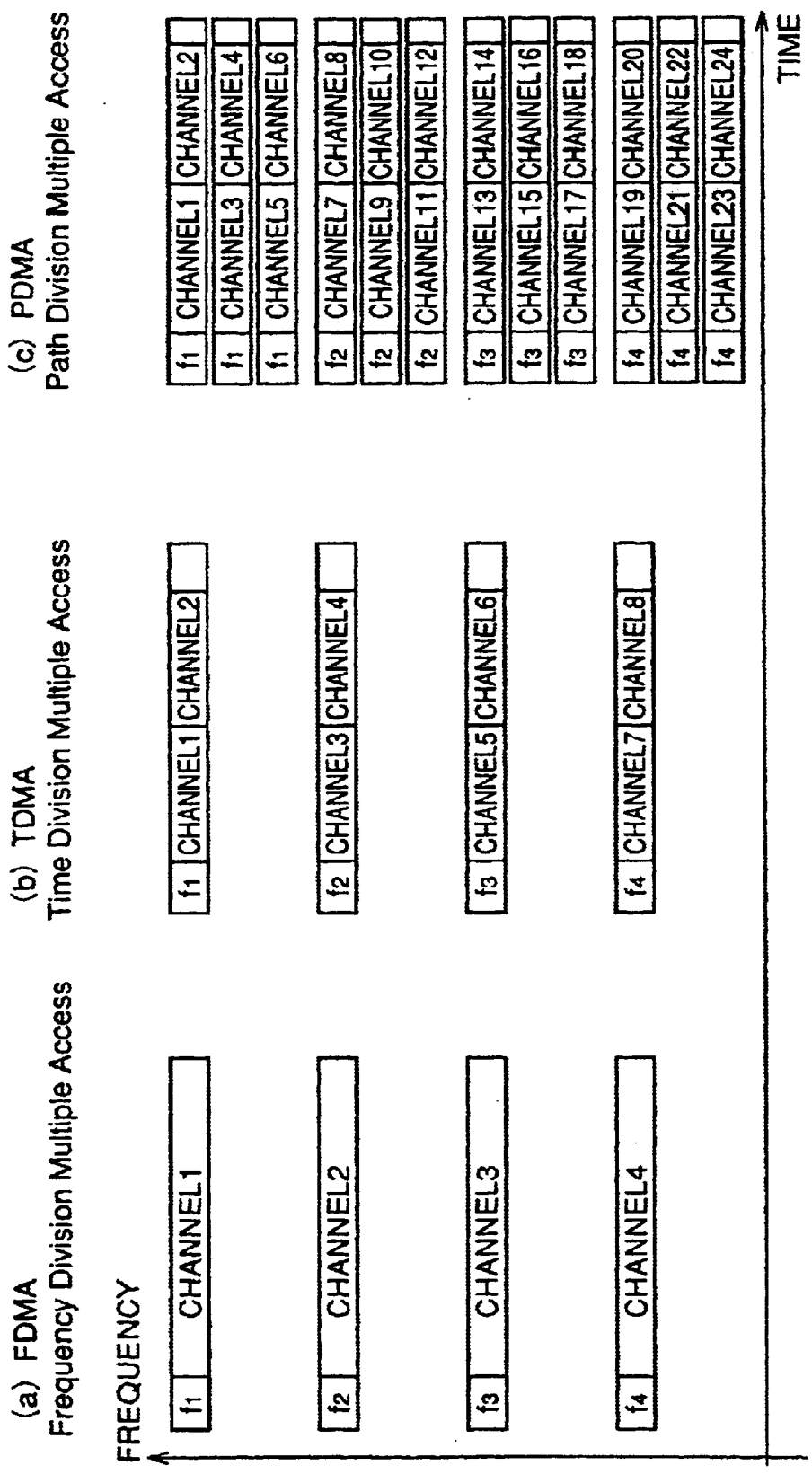
FIG. 13 is a diagram showing arrangements of channels in various communication systems.

FIGS. 11 and 12 are flow charts shown in conjunction with the operation of channel allocation device 1050 according to the third embodiment of the present invention.

In the first embodiment, the channel allocation is performed in accordance with the cross correlation value of the reception signal coefficient vectors as well as the difference in reception signal power of the currently connected user and the newly requesting user, In the third embodiment, the channel allocation is performed in accordance with a difference in arrival direction as well as a difference in reception signal power of the currently connected user and the newly requesting user.

More specifically, in a step S310 of FIG. 11, a difference in arrival direction Ddiff is calculated. In a step S312, if Ddiff exceeds a prescribed value, it is determined that interference between the currently connected user and the newly requesting user is small. In this respect, the structure of the third embodiment is different from channel allocation device 1050 of the fist embodiment in which interference between the currently connected user and the newly requesting user is small if the cross correlation value of the reception signal coefficient vector is below a prescribed value. -Here, the term "a difference in arrival direction" can be defined as an angle formed by arrival directions.

The other parts of the structure are the same as that for a channel allocation process of the first embodiment, and therefore description thereof will not be repeated.

Some methods of the above described estimation of the arrival direction are disclosed in the following references.

i) R. O. Schmidt, "Multiple Emitter Location and Signal Parameter Estimation," IEEE Trans., Antennas and Propagation, Vol. 34, No. 3, pp. 276–280, March 1986 ii) R. T. Williams, et al., "An improved Spatial Smoothing Technique for Bearig Estimation in a Multipath Environment," IEEE Trans., Acoustics, Speech and Signal Processing, Vol. 36, No. 4, pp. 425–432, April 1988 iii) Tie-Jan Shan, et al., "On Spatial Smoothing for Direction-of-Arrival Estimation of Coherent Signals," IEEE Trans., Acoustics, Speech and Signal Processing, Vol. 33, No. 4, pp. 806–811, August 1985

Such a structure enables channel allocation in accordance with not only the difference in arrival direction but also reception signal power in the operation of channel allocation device 1050, so that a sufficient communication quality is ensured for each user who is in connection with the communication channel Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of allocating transmission channels for multiple connection to a base station having array antennas to respective terminal devices in response to connection requests from a plurality of terminal devices, comprising:

the step of searching connectable transmission channel candidates from empty transmission channels in accordance with a magnitude of cross correlation between a reception signal coefficient vector from a currently connected user and a reception coefficient vector from a user newly requesting user;

the step of measuring reception signal power of said currently connected user;

the step of measuring reception signal power of said newly requesting user; and the step of allocating said transmission channel from said transmission channel candidates to said newly requesting user in response to a fact that a difference in reception signal power of said currently connected user and said newly requesting user is smaller than a prescribed value.

2. The transmission channel allocation method according to claim 1, wherein said transmission channel includes a plurality of time slots multiplexed in a direction of a time axis, each of said time slots has a plurality of path-divided channels, and said step of searching said transmission channel candidate includes the step of determining a connectable empty channel in accordance with a cross correlation value of said reception signal coefficient vectors of said currently connected user and said newly requesting user for every one of said time slots.

3. The transmission channel allocation method according to claim 2, wherein a cross correlation value C of a reception signal coefficient vector $H_{(i,k)}$ of a user currently connected to the (i, k)th channel and a reception signal coefficient vector Hn of said newly requesting user is calculated in accordance with a following equation $$C=|(H_{(i,k)} \cdot Hn)|/(|H_{(i,k)}| \cdot |Hn|)$$

where $(H_{(i,k)} \cdot Hn)$ represents an inner product of vectors $H_{(i,k)}$ and Hn, and $|H_{(i,k)}|$ and $|Hn|$ respectively represent magnitudes of vectors $H_{(i,k)}$ and Hn.

4. The transmission channel allocation method according to claim 1, wherein said transmission channel includes a plurality of time slots multiplexed in a direction of a time axis, each of said time slots has a plurality of path-divided channels, and said step of searching said transmission channel candidate includes the step of determining a connectable empty channel in accordance with a cross correlation value C of weight vectors of said currently connected user and said newly requesting user for every one of said time slots.

5. The transmission channel allocation method according to claim 4, wherein said cross correlation value C of a reception signal coefficient $W_{(i,k)}$ of a user currently connected to the (i, k)th channel and a reception signal coefficient vector Wn of said newly requesting user is calculated in accordance with a following equation $$C=|(W_{(i,k)} \cdot Wn)|/(|W_{(i,k)}| \cdot |Wn|)$$

where ($W_{(i,k)}$·Wn) represents an inner product of vectors $W_{(i,k)}$ and Wn, and $|W_{(i,k)}|$ and |Wn| respectively represents magnitudes of $W_{(i,k)}$ and Wn.

6. The transmission channel allocation method according to claim 1, wherein said transmission channel includes a plurality of time slots multiplexed in a direction of a time axis, each of said time slots has a plurality of path-divide channels, and said step of searching said transmission channel candidate includes the step of determining a connectable empty channel in accordance with an angular difference in arrival direction of reception signals from said currently connected user and said newly connected user for every one of said time slot.

7. A radio apparatus (1000) for performing path division multiple access with respect to a plurality of terminal devices, comprising:

array antennas (#1 to #N);

a plurality of reception signal separating portions (1010.1 to 1010.M) for separating in real time reception signals by multiplying reception weight vectors corresponding to said terminal devices by signals from said array antennas;

a reception signal power calculating portion (1030) respectively deriving reception signal power for each of said terminal devices based on the reception signals separated by said reception signal separating portions; and a channel allocating portion (1050) determining a connectable transmission channel of empty transmission channels in accordance with a magnitude of cross correlation between reception signals from a currently connected user and a newly requesting user as well as a difference in reception signal power for allocation of said transmission channel to said newly requesting user.

8. The radio apparatus according to claim 7, wherein said transmission channel includes a plurality of time slots multiplexed in a direction of a time axis, each of said time slot has a plurality of path-divided channels, and said channel allocating portion includes a reception signal vector calculating portion for deriving reception signal coefficient vectors of the currently connected user and the newly requesting user, and an allocation channel calculating portion for determining the connectable channel of said empty transmission channels in accordance with a cross correlation value of said reception signal coefficient vectors of said currently connected user and said newly requesting user for every one of said time slots.

9. The radio apparatus according to claim 8, wherein said cross correlation value C of a reception signal coefficient vectors $H_{(i,k)}$ of a user currently connected to the (i, k)th channel and a reception signal coefficient vector Hn of said newly requesting user is calculated in accordance with the following equation $$C=|(H_{(i,k)} \cdot Hn)|/(|H_{(i,k)}| \cdot |Hn|)$$

where ($H_{(i,k)}$·Hn) represents an inner product of vectors $H_{(i,k)}$ and Hn, and $|H_{(i,k)}|$ and |Hn| respectively represent magnitudes of $H_{(i,k)}$ and Hn.

10. The radio apparatus according to claim 7, wherein said transmission channel includes a plurality of time slots multiplexed in a direction of a time axis, each of said time slots has a plurality of path-divided channels, and said channel allocating portion includes an allocation channel calculating portion for determining the connectable transmission channel of the empty transmission channels in accordance with a cross correlation value of reception weight vectors of said currently connected user and said newly requesting user as well as a difference in reception signal power for every one of said time slots.

11. The radio apparatus according to claim 10, wherein a cross correlation value C of a reception signal coefficient vector $W_{(i,k)}$ of a user currently connected to the (i, k)th channel and a reception signal coefficient vector Wn of said newly requesting user is calculated in accordance with the following equation $$C=|(W_{(i,k)} \cdot Wn)|/(|W_{(i,k)}| \cdot |Wn|)$$

where ($W_{(i,k)}$·Wn) represents an inner product of vectors $W_{(i,k)}$ and Wn, and $|W_{(i,k)}|$ and |Wn| respectively represent magnitudes of $W_{(i,k)}$ and Wn.

12. The radio apparatus according to claim 7, wherein said transmission channel includes a plurality of time slots multiplexed in a direction of a time axis, each of said time slots has a plurality of path divided channels, and said channel allocating portion includes an arrival direction estimating portion for deriving arrival directions of reception signals from said currently connected user and said newly requesting user, and an allocation channel calculating portion for determining the connectable transmission channel of the empty transmission channels in accordance with an angular difference in arrival direction of reception signals from said currently connected user and from said newly requesting user as well as a difference in said reception signal power for every one of said time slots.

* * * * *